Figure 1:
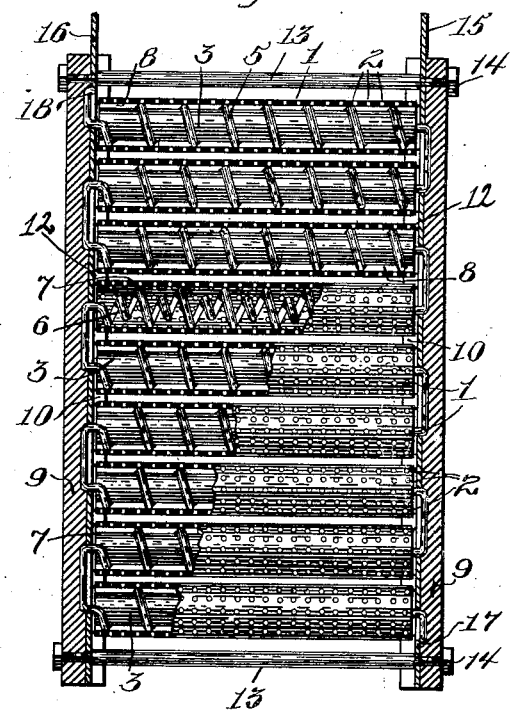

No. 893,330. PATENTED JULY 14, 1908.
J. KNOBLOCH.
SECONDARY BATTERY.
APPLICATION FILED SEPT. 14, 1904. RENEWED DEC. 19, 1906.

Witnesses.
C. G. Fuss
Robert Ast

Inventor.
John Knobloch,
By his Attorney,
J. H. Richards

UNITED STATES PATENT OFFICE.

JOHN KNOBLOCH, OF NEW YORK, N. Y., ASSIGNOR, BY MESNE ASSIGNMENTS, TO FRANZ SIGEL, OF NEW YORK, N. Y.

SECONDARY BATTERY.

No. 893,330.　　　　Specification of Letters Patent.　　　　Patented July 14, 1908.

Application filed September 14, 1904, Serial No. 224,367. Renewed December 19, 1906. Serial No. 348,626.

*To all whom it may concern:*

Be it known that I, JOHN KNOBLOCH, a citizen of the United States, residing in New York, Manhattan borough, in the county of New York and State of New York, have invented certain new and useful Improvements in Secondary Batteries, of which the following is a specification.

This invention has reference to an improved secondary or storage battery.

It is an object of the invention to increase the durability of the battery, to minimize cost, and to provide a battery adapted for transportation or mobile operation.

In the form illustrated the battery may be composed of a series of tube-sections of some suitable material, such as hard rubber, gutta percha, celluloid or the like, which may be held in the same plane, every tube preferably being parallel and equidistant with relation to the other tubes, whereby the work and activity of the entire device may be equalized. Each tube contains a material adapted to become active, which material may be, for instance, an oxid of lead, mixed with resilient sub-divided inactive material, like finely-divided cork or pure rubber; red lead, mixed with litharge, or any other material or substance suitable and efficient which, it is contemplated, should be elastic. This will obviate the difficulty, due to the expansion, of the material to become active, which will prevent the splitting of the tubes, and the elasticity of such material tends to maintain positive contact between the material to become active and the preferably convoluted section of conductor which may be embedded therein. These conductors may be so convoluted that each alternate convolution may be of a size less than the other and the conductors may be electrically united and grouped as may be desired to form the elements, for instance, by continuing the wire of one coil to the other coil. The tubes which form the element may be supported in a suitable frame. The frame may be formed of strips which may be clamped together by bolts or other suitable means. The strips may be wider than the diameter of the tubes thus to act as separators between adjacent elements which may be placed side by side and avoids the use of independently-movable separators.

I provide an improved form of cell for mobile or movable use by arranging a number of the tubular elements in a plane, fixed in a frame, and connecting alternate elements together in two series to form the positive and negative elements respectively. I may inclose these elements in a cell arranged vertically. By this means and arrangement, the displacement of the active material and the "wash" of the electrolyte is absolutely avoided and the durability and efficiency of the battery for locomotive power is greatly enhanced.

Figure 4:
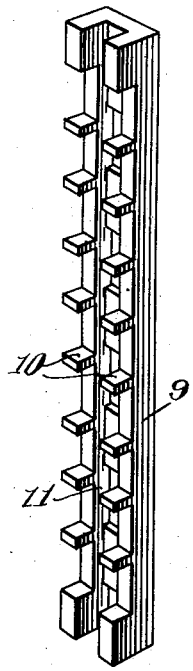
Figure 2:
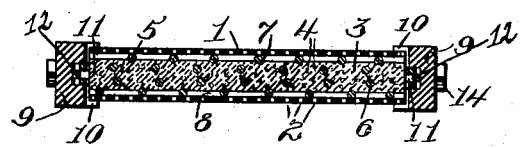
Figure 3:
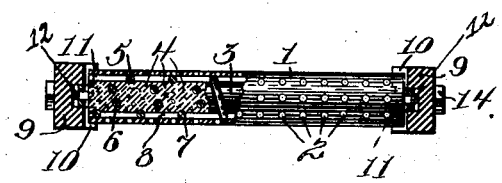

An embodiment of the invention is illustrated in the accompanying drawings, whereon Figure 1 shows an elevational view of the battery, partly in section and partly broken away. Fig. 2 shows one form of tube. Fig. 3 illustrates another form of tube and Fig. 4 illustrates a frame section.

Similar characters of reference indicate like parts in the figures.

In the form shown the tubular element may be composed of a tube or cylinder 1 of suitable material, such as rubber, gutta percha, celluloid, or the like, and which may be provided with perforations 2. Suitable active material 3, such as oxid of lead, is placed in these tubes 1, and with it may be mixed a yielding resilient inactive material, such for instance, as finely-divided cork or pure rubber 4, which, when the material becomes active, yields and prevents such expansion as would ordinarily cause cracking the tubes during the process of chemical change in the material incident to immersion in the electrolyte. If desired, however, litharge or any other suitable material may also be mixed with said lead. Within the tubes 1 there may be convoluted a wire 5 of conducting material, which wire may be of lead or an alloy of lead and antimony. This wire is so convoluted that each alternate convolution will be embedded into the body of the core, such convolutions being designated by 6, and the other convolutions, as 7, will surround the core of the lead oxid. Such convolutions 7 will project beyond the face of said core, thus leaving spaces 8 between the convolutions, the core and the wall of the tube. A series of these tubes may be located in a vertical plane by means of a frame composed of two strips 9 having shelves 10 arranged equidistantly and divided, as at 11, to receive the contact strip or lug 12. These strips are preferably of greater width or breadth than the diameter of the tubes 1 (see Fig. 4), being thus fitted to act as separators and hold the parallel series of tubular elements in a plane. These strips are held together by bolts 13 and nuts 14, preferably of non-conducting material, such as hard rubber. These bolts 13 (in pairs) and nuts 14 unite the strips 9 and clamp them firmly against the opposite ends of the tubes.

I prefer that the conductor 5 shall be continued from one binding post to the other in alternation, and that one end of said conductor 5 shall be secured to one binding post, as at 17, and to the other, as at 18.

It will now be observed that I have provided a battery, of the secondary class, in which the tubes or casings are preferably of rubber, celluloid, gutta percha, or the like, and which may be preforated, and within which is a convoluted conductor, in the bore of which is located a core of active material, such core, however, being separated from the casing as set forth. It will also be observed that the conductors may be made from one continuous wire, which is a desideratum in manufacture, and thereby forming such conductors of coils alternate in size, the smaller coils will serve to give constant contact with the lead, while the larger ones will support the tubes.

Having thus described my invention, I claim:

1. In a secondary battery, an element consisting of a series of perforated tubes, a core of material to become active disposed in said tubes, and a conductor so arranged in each tube that some portions thereof will be entirely inclosed by said material while other portions will surround said material.

2. In a secondary battery, an element consisting of a series of perforated tubes, a core of material to become active disposed in each tube, a conductor so convoluted with each tube that certain of the convolutions will be inclosed by said material while others will surround said material, a frame for said tubes, and binding posts to which said conductor is united.

3. In a secondary battery, an element consisting of a series of perforated tubes, a core of material to become active located in each tube, a conductor so convoluted within each tube that certain of the convolutions will be entirely inclosed by said material while other convolutions will surround such material, a frame of insulating strips in a width greater than the diameter of the tubes, and electrical connections uniting said conductor sections with the battery terminal.

4. In a secondary battery, an element consisting of a series of tubes, a core of material to become active within each tube, a conductor so convoluted within each tube that certain convolutions will be inclosed by the material while others surround the material, and a frame.

5. In a secondary battery, an element consisting of a series of tubes, a core within each tube, a sectional conductor so convoluted that certain convolutions will be entirely inclosed by said material while others surround said material, each section of conductor being a continuation of another section, the opposite extremities of such sections being united to the binding posts of said battery.

6. In a secondary battery, a perforated tube composed of a sheet of material bent upon itself to form a tube the edges of which overlap but are not fastened to allow for the expansion of a non-metallic active material contained therein.

Signed at Nos. 9 to 15 Murray St., New York, N. Y., this 9" day of September, 1904.

JOHN KNOBLOCH.

Witnesses:
FRED. W. BARNACLO,
FRED. J. DOLE.